Dec. 25, 1928.
C. E. LEHR
1,696,806
DEVICE FOR TREATING RODS
Filed July 9, 1923
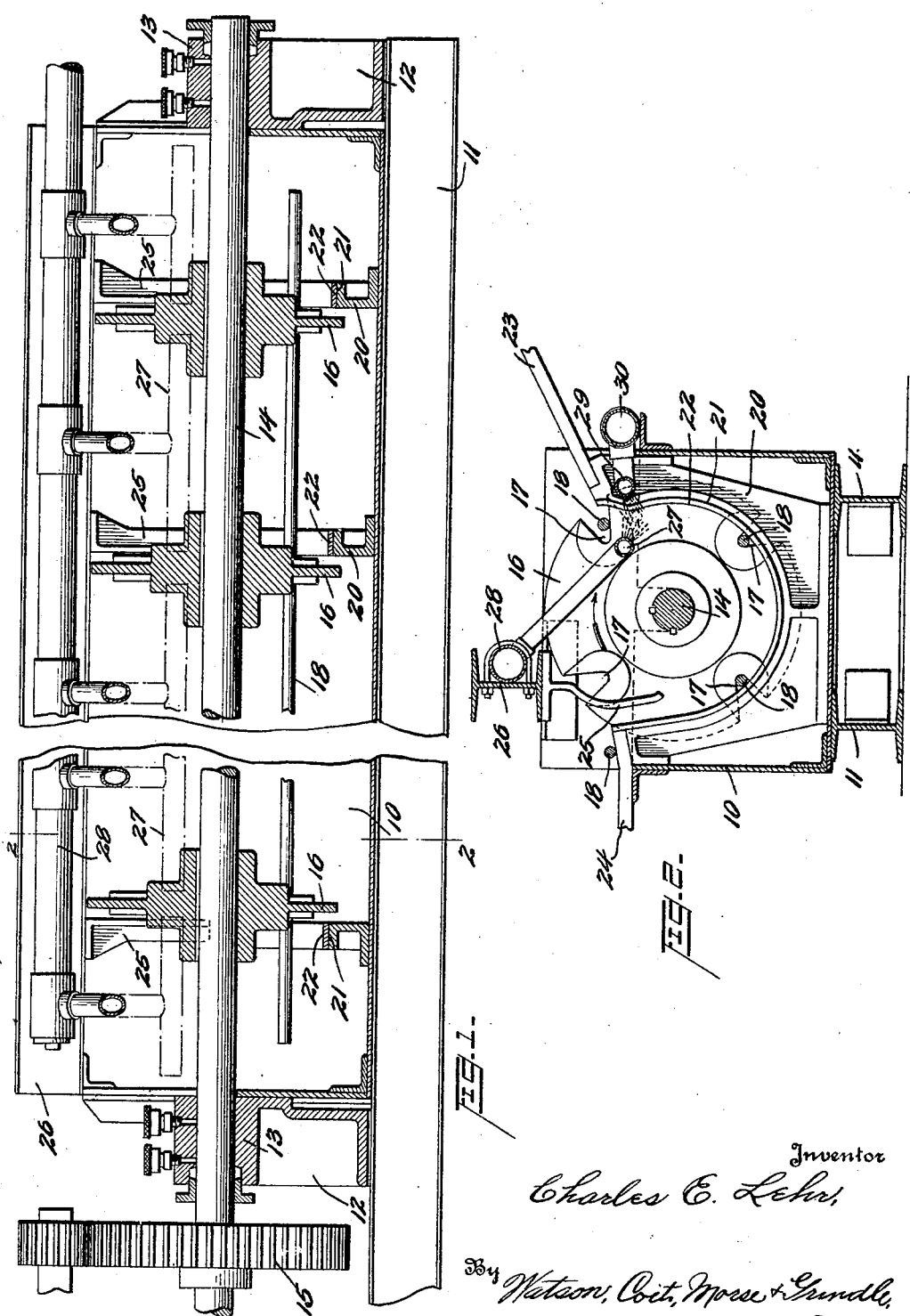

Patented Dec. 25, 1928.

1,696,806

UNITED STATES PATENT OFFICE.

CHARLES E. LEHR, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

DEVICE FOR TREATING RODS.

Application filed July 9, 1923. Serial No. 650,464.

The present invention relates to machines for treating rods or tubes and has particular reference to machines of this class designed for use in subjecting relatively long rods or tubes to liquids in heat treating the same, or for cooling, or pickling such articles with any desired solution.

The object of the invention is to provide a machine of this character which may be automatic in its action if desired, in which the time of the treatment can be accurately controlled, and in which the tubes or rods in course of treatment are held against warping or distortion. The machine may be so designed that the rods or tubes are immersed in a liquid bath of the desired character for the desired length of time or spraying devices may be employed so positioned that the work is subjected to a spray simultaneously on all sides, or both spray devices and liquid bath may be used if desired. Two of the machines may be used where it is desired to subject rods or tubes of steel, brass or other composition to an acid or saline bath or pickling process and then to water or a neutralizing solution. The passage through each machine may be automatic and the entire process carried out without handling the material. Due to the means for preventing warping of the work the rods handled by this machine can be more successfully handled in further treatment or straightening processes with little damage to the fibers, their strength being thus preserved.

The machine can be made in various ways without departing from the scope of the invention, the design and arrangement of the component parts being capable of considerable modification, and the embodiment of the invention which is illustrated in the accompanying drawings is given by way of example only. In the drawings:

Figure 1 is a longitudinal section through the machine; and

Figure 2 is a section on line 2—2 of Figure 1.

A vat or tank is indicated at 10 which tank may be constructed of materials well adapted to resist the action of acids or other solutions and which is mounted upon sills 11 or other suitable base. Supported without the ends of the tank and also on sills 11 are pedestals 12 at the upper ends of which are bearings 13 for the longitudinally extending shaft 14, which projects through openings in the end walls of the tank. Upon one end of this shaft is secured a drive gear 15 or any other equivalent means for driving the shaft at a uniform speed of rotation. Also mounted upon shaft 14, but within the tank 10 are a plurality of disk-like members 16 which, taken together, constitute an endless conveyor for the work. Aligned notches 17 are provided in the several disks, in the present instance there being four of these notches, equidistantly spaced in each disk, and which notches are V-shaped and adapted to receive the tubes or rods 18.

Associated with each conveyor 16 is a guide or slide 20 mounted in the tank and having a cylindrical surface 21 with its axis coincident with the axis of the shaft 14. A liner or wearing member 22 constitutes a protective facing for the surface 21 and against this liner the rods or tubes 18 slide as the endless conveyor rotates in the direction of the arrow, Figure 2. A feed platform is indicated at 23 and a discharge platform at 24. Stationary arms 25 secured to and extending downwardly from the beam 26 mounted on the top of the tank act as cam members lifting the rods 18 out of the sockets or recesses 17 as they approach the discharge platform 24 and depositing them upon this platform. One such arm 25 is provided for each disk 16.

A spray tube is indicated at 27, which is fed from a manifold 28 and a second spray tube is indicated at 29 which is fed from a manifold 30. These spray tubes are positioned to successively subject the rods or tubes 18 to a flow of fluid which immediately reaches the entire surface of each. In certain classes of work it is undesirable to gradually immerse the tube or rod in the liquid because of the tendency to warp, and in such cases the sprays are found to be useful. The use of these sprays is however optional and they may be dispensed with, the liquid in the tank alone being relied upon to accomplish the desired object.

In operation the bars or rods are fed to the machine down the feed platform 23 and each passing notch or recess 17 of the conveyor receives one rod. The conveyor is rotated in the direction of the arrow and the rod is clamped between the bottom of the notch and the surface 22 of the guiding slide. A sufficient number of conveyor disks 16 are provided to prevent warping of the work. The notches 17 may be so designed that the work is closely confined in this manner and, where the character and size of the work vary from time to time, the dimensions of the notches may be varied or the disks replaced by ones having notches of the desired dimension. Warping of the work under treatment is thus positively prevented and its discharge is automatically effected by means of the arms 25. Two or more of the machines may be placed in series and the work subjected to one process in the first machine and a second process in the second machine, the travel of the work through both machines being however entirely automatic. By regulating as desired the speed of rotation of the conveyor the time of the treatment in any particular case may be accurately determined. For example, the total time of immersion for articles heated to 1600° F. and drawn at 900° F. will vary from 1½ to 6 minutes depending on the size of the material and the physical characteristics required. In practice, this apparatus is used in combination with a continuous heating furnace. Each article is discharged from the tempering bath at a temperature of from 100° to 200° F., being thereupon checked by a scleroscopic test. Any conditions of this test may be met by altering the speed of travel of the articles through the cooling medium using both the spraying devices and the bath or the bath alone, according to the rate of cooling desired. The circulation of the cooling fluid may be by a pump or by any other suitable means and is not shown on the drawing. The use of this apparatus has made it possible to maintain constant conditions of tempering throughout a long continuous run of similar articles to conform to stringent physical tests. The materials used in the construction of the machine may vary widely according to the uses to which it is to be put and the exact character of the liquid contained in the tank. One skilled in the art will appreciate the advantages of the machine and also be aware that the design and arrangement of its component elements may be considerably modified without departing from the scope of the invention.

Having thus described the invention what is claimed as new and desired to be secured by Letters Patent is:

1. In a machine for treating tubes or rods, the combination of a vat, a rotatable shaft extending longitudinally of the vat, a plurality of discs secured to the shaft and having aligned open recesses therein, guides arranged adjacent to the discs and having guiding surfaces disposed inwardly of the peripheries of the discs, feeding means cooperating with the guides, and means cooperating with the outlet end portions of the guides to assure the removal of treated rods or tubes from the disc recesses.

2. In a machine for treating tubes or rods, the combination of a vat, a rotatable shaft extending longitudinally of the vat, a series of discs secured to the shaft and having aligned open recesses, a series of U-shaped guide members in the vat and beneath the shaft, each guide member having its guiding surfaces disposed adjacent to a disc and inwardly of the periphery thereof, an inclined feeding platform associated with the inlet portions of the guide members, a discharge platform associated with the outlet portions of the guide members, and stationary deflectors cooperating with the outlet portions of the guides for assuring the removal therefrom of treated rods or tubes on to the discharge platform.

3. In a machine for tempering rods and tubes the combination of, a cooling bath, suspension means for continuously passing heated rods through the bath, guide means to maintain the rods out of contact with the sides of the bath, said guide means cooperating with the carrying means to preserve the alignment of the rods, spraying nozzles disposed parallel to the rods above their points of immersion in the cooling bath and ejecting means for the rods disposed above their points of emergence from the bath and adjacent to the suspension means.

In testimony whereof I hereunto affix my signature.

CHARLES E. LEHR.